United States Patent
Balasubramanian et al.

(10) Patent No.: US 11,157,980 B2
(45) Date of Patent: Oct. 26, 2021

(54) BUILDING AND MATCHING ELECTRONIC USER PROFILES USING MACHINE LEARNING

(71) Applicant: International Business Machines Corporation, Armonk, NY (US)

(72) Inventors: Swaminathan Balasubramanian, Troy, MI (US); Avijit Chatterjee, White Plains, NY (US); Rajiv Joshi, Yorktown Heights, NY (US); John J. Thomas, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 15/856,883

(22) Filed: Dec. 28, 2017

(65) Prior Publication Data

US 2019/0205950 A1 Jul. 4, 2019

(51) Int. Cl.
*G06Q 30/06* (2012.01)
*G06Q 30/02* (2012.01)
(Continued)

(52) U.S. Cl.
CPC ..... *G06Q 30/0623* (2013.01); *G06F 16/9535* (2019.01); *G06N 20/00* (2019.01);
(Continued)

(58) Field of Classification Search
CPC ............. G06Q 30/0601–0643; G06Q 30/0282
See application file for complete search history.

(56) References Cited

U.S. PATENT DOCUMENTS 8,135,800 B1 3/2012 Walsh et al.
8,452,658 B2 5/2013 Urbanski
(Continued)

FOREIGN PATENT DOCUMENTS

WO WO-2013039922 A1 * 3/2013 ............... G09B 7/02

OTHER PUBLICATIONS

F. Esposito, S. Ferilli, T. M. A. Basile and N. Di Mauro, "Automatic content-based indexing of digital documents through intelligent processing techniques," Second International Conference on Document Image Analysis for Libraries (DIAL'06), 2006, pp. 16-pp. 219, doi: 10.1109/DIAL.2006.5.*

(Continued)

Primary Examiner — Resha Desai
(74) Attorney, Agent, or Firm — Patterson + Sheridan, LLP

(57) ABSTRACT

Method and apparatus for generating profiles using machine learning and influencing online interactions are provided. The methods include receiving, from a first user of a plurality of users, a first set of electronic documents, where each electronic document in the first set of electronic documents corresponds to a respective user in the plurality of users. The methods also include identifying a plurality of user profiles, where each of the plurality of user profiles was generated by processing a corpus of electronic documents associated with each respective user using a first trained machine learning model. The methods include determining a plurality of match coefficients, based on comparing a plurality of user profiles associated with each respective user in the plurality of users, filtering the first set of electronic documents based on the plurality of match coefficients, and providing the filtered first set of electronic documents to the first user.

20 Claims, 8 Drawing Sheets

(51) Int. Cl.
*H04L 29/08* (2006.01)
*G06N 20/00* (2019.01)
*G06F 16/9535* (2019.01)

(52) U.S. Cl.
CPC ..... *G06Q 30/0282* (2013.01); *G06Q 30/0627* (2013.01); *H04L 67/306* (2013.01)

(56) References Cited

U.S. PATENT DOCUMENTS

| | | | |
|---|---|---|---|
| 8,521,688 | B1 | 8/2013 | Belwadi et al. |
| 8,645,224 | B2 | 2/2014 | Engle |
| 9,129,311 | B2 | 9/2015 | Schoen et al. |
| 9,378,065 | B2 * | 6/2016 | Shear .................. G06F 40/00 |
| 9,405,825 | B1 * | 8/2016 | Kuznetsova .......... G06F 16/345 |
| 10,296,873 | B1 * | 5/2019 | Balasia ............. G06F 16/24578 |
| 10,475,100 | B1 * | 11/2019 | Herz ................. G06Q 30/0629 |
| 2003/0018487 | A1 | 1/2003 | Young et al. |
| 2007/0078851 | A1 * | 4/2007 | Grell .................. G06F 16/9537 |
| 2010/0211411 | A1 | 8/2010 | Hudson |
| 2010/0228582 | A1 | 9/2010 | King et al. |
| 2011/0225048 | A1 | 9/2011 | Nair |
| 2014/0114741 | A1 * | 4/2014 | Genc-Kaya ........ G06Q 30/0242 705/14.41 |
| 2014/0304189 | A1 * | 10/2014 | Sullivan, IV ...... G06Q 30/0282 705/347 |
| 2015/0006280 | A1 | 1/2015 | Ruiz et al. |
| 2016/0232546 | A1 * | 8/2016 | Ranft .................. G06Q 40/025 |
| 2016/0246791 | A1 * | 8/2016 | Long ................. G06F 16/24578 |
| 2016/0253710 | A1 | 9/2016 | Publicover et al. |
| 2018/0211333 | A1 * | 7/2018 | Lackman ................ G06F 40/30 |
| 2019/0180095 | A1 * | 6/2019 | Ferguson ................ G06F 40/30 |
| 2020/0067861 | A1 * | 2/2020 | Leddy .................... H04L 51/12 |

OTHER PUBLICATIONS ip.com No. IPCOM000195935D, Anonymous, May 24, 2010, "A mechanism to dynamically push advertisement according to user's interest".

* cited by examiner

 4 STARS, BASED ON 5,737 REVIEWS

| FILTER BY: | ALL REVIEWERS |

 3.5 STARS, BASED ON 1,351 REVIEWS

| FILTER BY: | REVIEWERS WITH MATCHING PRINCIPAL ATTRIBUTES |

 4.5 STARS, BASED ON 4,386 REVIEWS

| FILTER BY: | REVIEWERS WITH DIFFERING PRINCIPAL ATTRIBUTES |

 3 STARS, BASED ON 1,872 REVIEWS

| FILTER BY: | REVIEWERS WITH MATCHING RRELEVANT PRINCIPAL ATTRIBUTES |

 5 STARS, BASED ON 3,865 REVIEWS

| FILTER BY: | REVIEWERS WITH DIFFERING RELEVANT PRINCIPAL ATTRIBUTES |

BUILDING AND MATCHING ELECTRONIC USER PROFILES USING MACHINE LEARNING

BACKGROUND

The present invention relates to machine learning, and more specifically, to using machine learning to generate standards profiles for users.

Individuals can conveniently shop online for a wide variety of products and services, from a tremendous number of organizations. With the ever-growing number of organizations that can be reached, along with the overwhelming number of choices for any given product or service, it is difficult for consumers to decide whether or not to purchase the product or service. One solution has been to introduce reviews and ratings for products and services, provided by other consumers. For example, individuals who purchase a product or service can evaluate the product or service by posting a publicly-accessible review, which may be useful to others in deciding whether or not to purchase the product or service. Problematically, there is no mechanism that allows a user to determine whether they are likely to agree with the person who provided the review, which significantly reduces the utility of the evaluation.

SUMMARY

One embodiment described herein provides a method that includes receiving, from a first user of a plurality of users, a first set of electronic documents, where each electronic document in the first set of electronic documents corresponds to a respective user in the plurality of users. The method further includes identifying a plurality of user profiles, where each of the plurality of user profiles was generated by processing a corpus of electronic documents associated with each respective user using a first trained machine learning model, and where each user profile specifies a plurality of attribute values for a plurality of principle attributes. Further, the method includes determining a plurality of match coefficients, one for each of the plurality of users, based on comparing a user profile associated with the first user and a plurality of user profiles associated with each respective user in the plurality of users. The method also includes filtering the first set of electronic documents by removing at least one electronic document from the first set based on a match coefficient associated with a second user of the plurality of users, where the at least one electronic document corresponds to the second user, and providing the filtered first set of electronic documents to the first user.

Another embodiment described herein provides a method that includes receiving, from a first user of a plurality of users, a plurality of electronic documents, where each of the plurality of electronic documents was created by a respective user in the plurality of users. The method further includes determining a plurality of match coefficients for a plurality of principal attributes by comparing principal attributes of the first user with principal attributes of each respective user in the plurality of users, and filtering the plurality of electronic documents based at least in part on the determined match coefficients.

Other embodiments include, without limitation, a computer-readable medium that includes instructions that enable a processing unit to implement one or more aspects of the disclosed methods, as well as a system having a processor, memory, and application programs configured to implement one or more aspects of the disclosed methods.

BRIEF DESCRIPTION OF THE SEVERAL VIEWS OF THE DRAWINGS

FIGS. 6A through 6E illustrate filtered reviews, according to one embodiment of the present disclosure.

DETAILED DESCRIPTION

People generally want to ensure that they are purchasing quality products and services. However, existing review systems do not allow users to determine how likely they are to agree with a given evaluation, nor do they enable the user to filter reviews based on how similar they are to the person who provided the review. To that end, embodiments of the present disclosure provide for utilizing supervised machine learning techniques to generate and maintain a set of profiles for users, as well as methods for evaluating those profiles and influencing online interactions. This allows for an objective system that is not dependent on lengthy self-assessments, which are time-consuming and prone to inaccuracy, as there is no verification involved, and provides a seamless and convenient platform for interactions among entities.

Figure 1:
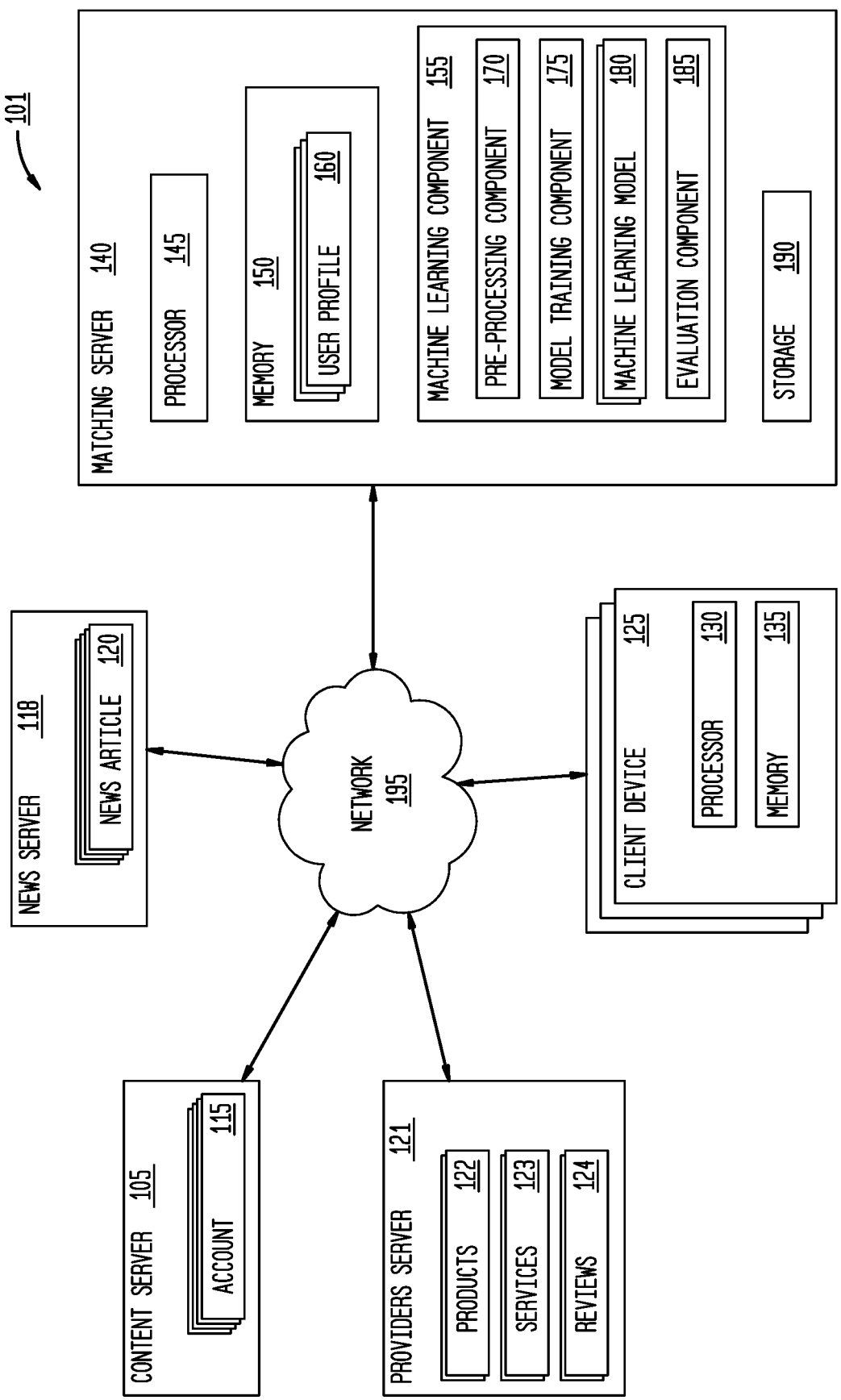
FIG. 1 illustrates an example computing environment, according to one embodiment of the present disclosure.

With reference now to FIG. 1, an example computing environment 101 is provided. The illustrated embodiment includes a number of Content Servers 105 and a Providers Server 121, as well as a News Server 118. The environment also includes a plurality of Client Devices 125 and a Matching Server 140. Each of the Content Servers 105, as well as Client Devices 125 and Matching Server 140 may communicate with each other and with other devices using Network 195. Network 195 may be any communications network, and may be wired, wireless, or a combination thereof. Network 195 may be, for example, the Internet.

Content Server 105 comprises data about a plurality of Accounts 115 or users. Each Content Server 105 may be, for example, a social media platform that allows its users to maintain Accounts 115. In an embodiment, each Account 115 corresponds to an individual user. Content Server 105 includes a corpus of information associated with each Account 115. This information may include pictures, videos, and audio recordings of the respective Account 115. Content Server 105 further includes textual information authored by each user associated with the respective Account 115, such as status updates, blog posts, comments, and the like. The information also includes data about things the user associated with Account 115 has expressed a like or dislike for. In addition, the information may further include not only data authored by the user of Account 115, but also data shared by the Account 115. Although two Content Servers 105 are illustrated, there may of course be many social media servers, each including similar information about its Accounts 115 or users.

The illustrated embodiment further includes a Provider Server 121 comprising a number of Products 122 and Services 123. Similarly to the above discussion, there may of course be many different Providers Servers listing Products 122 and/or Services 123, although just one is illustrated. For example, there may be a plurality of Providers Servers 121, each corresponding to a different online retailer where users can purchase or order goods and services. Each of the Products 122 and Services 123 is associated with one or more Reviews 124, which may be provided by a user. For example, in an embodiment, consumers who have purchased a particular Product 122 or Service 123 may submit an evaluation of the product, which allows other users to be better informed about the quality of the product or service, as well as about the quality of the associated provider of the product or service. In an embodiment, these evaluations or reviews may include natural language textual data, a numerical rating, or both. In some embodiments, Reviews 124 may also be submitted by non-consumers, such as paid reviewers and the like. As will be discussed in more detail below, users of the Providers Server 121 may sort, filter, and otherwise interact with these reviews in a variety of ways.

The illustrated embodiment further includes a News Server 118 comprising News Articles 120. Similarly to the above discussion, there may of course be many different News Servers 118 with News Articles 120, although just one is illustrated. For example, there may be a plurality of News Servers 118, each corresponding to a respective news agency. In an embodiment, each News Article 120 may be associated with any number of topics.

Environment 101 also includes a plurality of Client Devices 125. Each Client Device 125 may be, for example, a computer or mobile device containing a Processor 130 and a Memory 135. Although not illustrated, Client Device 125 may also include one or more storage devices, a network interface, and an input/output (I/O) interface for connecting to I/O devices like keyboards, displays, and printers. As illustrated, Processor 130 retrieves and executes programming instructions stored in Memory 135 as well as stores and retrieves application data residing in storage. Processor 130 is representative of a single CPU, multiple CPUs, a single CPU having multiple processing cores, and the like. Memory 135 is generally included to be representative of a random access memory. Storage, if present, may be a disk drive storage device, and may include fixed and/or removable storage devices, such as fixed disk drives, removable memory cards, or optical storage, network attached storage (NAS), or storage area-network (SAN).

A user might use Client Device 125 to, for example, read News Articles 120 from one or more News Servers 118. Similarly, a user may use Client Device 125 to search for Products 122 and Services 123 on Providers Server 121, in order to purchase goods or request services. Further, a user can use Client Device 125 to access social media such as Content Servers 105 to maintain his or her account or profile, such as Account 115. For example, a user can use Client Device 125 to create a status update, share articles, upload pictures, videos, and audio, and the like. This data can all be stored for each Account 115.

The illustrated embodiment also includes Matching Server 140. As illustrated, Matching Server 140 includes a Processor 145, Memory 150, Machine Learning Component 155, and Storage 190. Processor 145 retrieves and executes programming instructions stored in Memory 150 as well as stores and retrieves application data residing in storage. Processor 145 is representative of a single CPU, multiple CPUs, a single CPU having multiple processing cores, and the like. Memory 150 is generally included to be representative of a random access memory. Storage 190 may be a disk drive storage device, and may include fixed and/or removable storage devices, such as fixed disk drives, removable memory cards, or optical storage, network attached storage (NAS), or storage area-network (SAN).

In the illustrated embodiment, Machine Learning Component 155 uses machine learning to parse a wide variety of documents to create User Profiles 160. In an embodiment, each User Profile 160 corresponds to a respective user. For example, the Machine Learning Component 155 could generate a User Profile 160 for a particular user of a Client Device 125, and in doing so, the Machine Learning Component 155 could consider content associated with the Account 115 for the particular user. In some embodiments, Machine Learning Component 155 parses and processes data regarding Accounts 115 in order to create User Profiles 160. Machine Learning Component 155 may do so automatically, e.g., without prompting from the user, for all Accounts 115 that are publically accessible. In some embodiments, however, Machine Learning Component 155 only creates and maintains User Profiles 160 for the users who request it, or who agree to have a User Profile 160 created for them. Further, in some embodiments, a user may be prompted to provide additional data beyond that which is available publically from their Account 115. For example, a user may provide extra permissions to Machine Learning Component 155 to access non-public aspects of Account 115, or the user may upload other data about themselves that is not available at all in Account 115. Additionally, in an embodiment, a User Profile 160 may be created for a user who does not have an Account 115 on social media, but is willing to provide other data about themselves to populate the User Profile 160.

As used herein, an electronic document refers to any electronically-stored textual data. With reference to a User Profile 160, an electronic document may include, for example, posts and comments on social media, blogs, articles, comments, reviews, and evaluations authored by the user, articles, posts, and comments the user has expressed a like or dislike for, and the like. Electronic documents also include textual data that is not created by the user, but nevertheless refers to or is associated with the user. For example, an electronic document associated with a user may be textual data about interactions the user has with other users or with providers of Products 122 and/or Services 123, as well as information about data that the user consumes. For example, an electronic document may include websites that the user frequents or articles that the user has read, even if they do not create any comments or posts there. Further, electronic documents can include handwritten documents which have been scanned into a computer, as well as papers, essays, articles, and the like that a user has authored. Thus, "electronic documents" broadly refers to any textual data about a user or created by a user.

Additionally, in some embodiments, "electronic documents" includes text transcripts that have been generated using speech-to-text systems with audio or video that includes the user. This transcript includes things that the user said, but in some embodiments also includes things that others said. For example, if a video includes one person talking about politics, and the user simply states "I agree completely," it may be beneficial to include the transcript of the other person's comments in the electronic document. This is similar to how an article that the user expresses a like for or comments on may be included as an electronic document, because it helps provide context to what the user was expressing.

In some embodiments, Machine Learning Component 155 processes data in addition to or instead of electronic documents. In an embodiment, Machine Learning Component 155 is also configured to process various numerical data in order to generate User Profiles 160. For example, in an embodiment, the length of time or proportion of time that a user spends browsing content is used to build and refine User Profile 160. The length of time that a user spends browsing specific categories on a shopping website such as Providers Server 121, specific News Articles 120 or specific News Servers 118, television and radio stations, and the like may be used alone to generate User Profile 160, but may similarly be used to weight the associated electronic documents. For example, if a user spends a large amount of time, or a large proportion of their time, browsing news articles about the environment, those news articles may be given greater weight by Machine Learning Component 155.

In some embodiments, Machine Learning Component 155 also considers financial or transactional data associated with a user. For example, in various embodiments, Machine Learning Component 155 also considers which products or services a user has purchased, the quantity purchased, how frequently the product or service is purchased, the total amount spent on the product or service, and the proportion of the user's total spending that the product or service accounts for. This information may be used as standalone input for Machine Learning Component 155, or may be used as weighting information in conjunction with other input. For example, if a user spends a significant amount of money on products that were created using animal testing, Machine Learning Component 155 may use that data to directly adjust User Profile 160, or may use the amount spent as weighting information when processing some other information, such as a description of the product.

In an embodiment, each Product 122 and Service 123 on Providers Server 121 is provided by an entity that provides the service or product. For example, a provider of a product 122 may be a manufacturer or retailer, while a provider of a Service 123 may provide a service such as cloud storage, landscaping, or any other service. In an embodiment, each of the Products 122 and Services 123 are available for purchase on Providers Server 121. Some embodiments include one or more Providers Servers 121 that merely aggregates reviews or evaluations for a Products 122, Services 123, as well as reviews of the providers themselves, as opposed to selling the Products 122 and Services 123. These Products 122 and Services 123 may be available for purchase online at some other website, or may be available for purchase only offline. Similarly, in an embodiment, some of the Products 122 and Services 123 may be provided in exchange compensation other than money, or for no compensation at all. Thus, each Providers Server 121 presents Reviews 124 to users, and may, in some embodiments, also enable the purchase of the associated Products 122 and Services 123. In various embodiments, Provider Server 121 may allow a user to search for Products 122, Services 123, providers of a product or service. Similarly, Provider Server 121 may allow a user to sort or filter the results, for example, based on relevance, age, price, purchase history, ratings, category, and the like.

User Profiles 160 generally include a number of attribute values or scores for a number of principles, attributes, or opinions. In an embodiment, the attributes include animals, environment, people, politics, and sustainability. A score for each attribute is determined based on a user or provider's opinions or beliefs regarding the attribute, as will be explained in more detail below. For example, a user's thoughts on animal testing, factory farming, animal cruelty, and the like all influence his or her attribute score in the "animals" dimension.

Machine Learning Component 155 generally processes a corpus of electronic documents about each user, and creates and maintains User Profiles 160. As illustrated, Machine Learning Component 155 includes Pre-Processing Component 170, Model Training Component 175, one or more Machine Learning Models 180, and Evaluation Component 185. Additionally, in some embodiments, Machine Learning Component 155 processes data about Products 122 and Services 123 to determine which user attributes are relevant to that Product 122 or Service 123, as will be discussed in more detail below.

Generally, Pre-Processing Component 170 processes electronic documents in order to facilitate there use with Model Training Component 175 and one or more Machine Learning Models 180, as will be discussed in more detail below. Generally, Model Training Component 175 is used to train and update the one or more Machine Learning Models 180, as will be discussed in more detail below. The one or more Machine Learning Models 180 are used to process electronic documents from users and create User Profiles 160, as will be discussed in more detail below. Although the one or more Machine Learning Models 180 are illustrated as a part of Machine Learning Component 155, the one or more Machine Learning Models 180 may be embodied in Memory 150, Storage 190, a combination thereof, or any other location capable of performing embodiments of the present disclosure. Finally, Evaluation Component 185 is generally used to compare and evaluate User Profiles 160, as will be discussed in more detail below.

In some embodiments, electronic documents are provided directly to Model Training Component 175 without pre-processing. In other embodiments, however, it is necessary or helpful to pre-process input data in order to facilitate the process. For example, in an embodiment, Pre-Processing Component 170 may process electronic documents to remove "stop words," or common words which do not provide meaning to the document. For example, such words could include "the," "is," "at," and the like. In some embodiments, the removal of stop words can increase the accuracy and efficiency of the one or more Machine Learning Models 180. In a related embodiment, Pre-Processing Component 170 may be configured to remove punctuation from input electronic documents, or other portions of an electronic document that are not useful for the present disclosure, such as metadata associated with the document. In some embodiments, however, metadata is retained for processing by Model Training Component 175. In an embodiment, Pre-Processing Component 170 is configured to perform speech-to-text functionality. For example, in order to facilitate the use of audio or video input to the Machine Learning Component 155.

In some embodiments, Pre-Processing Component 170 generates a feature vector for each of the electronic documents. In this embodiment, a feature vector is a vector having any number of dimensions which represents a numerical representation of the associated electronic document. In some embodiments, this vectorization of electronic documents may improve the speed, efficiency, and/or accuracy of the system. In some embodiments, the vectorization of the electronic documents is required for the Machine Learning Component 155 to process the input and generate User Profiles 160.

In some embodiments, Pre-Processing Component 170 may associate weights with input electronic documents. In other embodiments, weights may be assigned by Model Training Component 170, or by another component not illustrated in FIG. 1. In some embodiments, the electronic documents are not associated with any weighting at all. In embodiments that include weighting, the weights may be based on, for example, the source of a document. For example, an electronic document retrieved from one Content Server 105 may be given more weight by Model Training Component 175 than an electronic document that was retrieved from another. In another embodiment, the weighting is based on the type of electronic document. For example, a blog post associated with an Account 115 may be given more weight than a comment that is posted by the user of the Account 115.

Further, in some embodiments, the associated weight may depend in part on whether the electronic document was authored by the respective user or by another entity. For example, an article written by the user may be assigned a higher weight than an article written by another person that the user commented on or expressed a like for. In various embodiments, the weight associated with each electronic document can be based on any number of factors, including the size of the document, the format of the document, the author of the document, and the like.

Model Training Component 175 generally takes as input a set of electronic documents and a set of corresponding labels or attribute values, and generates one or more Machine Learning Models 180 which can be used to classify new electronic documents according to a number of dimensions or principle attributes. For example, as discussed above, the attributes may include "animals," "environment," "people," "politics," and "sustainability." In an embodiment, several concepts can be included within each attribute, to facilitate generation of the profiles and prevent creation of an excessive number of dimensions. For example, attitudes regarding animal testing, factory farming, and animal rights and cruelty may all be included within an "animals" attribute. In some embodiments, however, it may be preferable to enable a distinct attribute score for each of these "sub-attributes," in order to obtain a more perfect representation of the individual user or provider. Other examples of "sub-attributes" include opinions environmental reporting, climate change, pollution, habitats, and natural resources all coming under a broader "environment" category. Similarly, a "people" attribute can be sub-divided into beliefs regarding human and workers' rights, marketing, and the like. A "politics" attribute may include information about boycotts, political activity, controversial stances or technologies, and the like. Of course, these examples are merely illustrative and are not intended to limit the present disclosure in any way.

In an embodiment, the attribute value or score is a numerical indication of how "ethical" the particular user or provider is with respect to that attribute. For example, the attribute value may range from −1 to +1, with a score of 0 indicating ambivalence or neutrality. In some embodiments, the attribute score ranges from 0 to 100, or from 0 to 10, or any other range. In some embodiments, the attribute value or score is represented by a rating scale such as a Likert scale with any number of categories (typically five seven, or nine). For example, each attribute value could indicate a user's beliefs for each attribute, ranging from "extremely supportive" to "extremely opposed," with any number of options in between. For example, on the topic of genetically modified organisms, a user's score could range from −1, indicating that the user is opposed to GMOs, to +1, indicating that the user supports or likes GMOs.

In the illustrated embodiment, Model Training Component 175 is provided with a set of electronic documents and a corresponding set of attribute values. Thus, when generating or updating a Machine Learning Model 180 for use with user data, an administrator may provide the Model Training Component 175 with electronic documents relating to users and a label or attribute value for each document. For example, the administrator may provide as input blog posts, social media updates, and the like, as discussed above, along with an attribute score for each document. This attribute score may be determined, for example, by the administrator. In some embodiments, the attribute values for the initial training exemplars may be determined by vote. For example, a particular electronic document may be presented, and one or more people may score it along the various principle dimensions, with the ultimate score provided to the Model Training Component 175 being determined at least in part on the aggregate votes. While processing the documents and the associated attribute values, Model Training Component 175 creates and updates the respective Machine Learning Model 180. After training is complete, the Machine Learning Model 180 can receive as input a new electronic document that it has never seen before, and score it along the various attributes in order to determine the opinions, principles, beliefs, and ethics of the author or subject matter.

In some embodiments, Model Training Component 175 trains a single Machine Learning Model 180 to recognize and classify electronic documents and score or generate attribute values as well. In other embodiments, Model Training Component 175 is used to train a first Machine Learning Model 180 to identify and classify relevant attributes in a document, as well as a second Machine Learning Model 180 to actually rate or score the documents. Thus, in some embodiments, a first Machine Learning Model 180 may be trained to determine which attribute or attributes a given electronic document corresponds to, and a second Machine Learning Model 180 may score or determine the values for each attribute. Similarly, if the input document relates to a particular Product 122 or Service 123, a Machine Learning Model 180 may be trained by Model Training Component 175 to determine which attributes are relevant to that Product 122 or Service 123.

In an embodiment, a relevant attribute to a given Product 122 or Service 123 is an attribute that a user might consider important, useful, or relevant when deciding whether or not to purchase the Product 122 or Service 123. For example, relevant profile attributes for a car or truck may include an "environment" domain, and more particularly, a "pollution" sub-domain. In this example, the "environment" attribute is relevant to a car because the user's beliefs regarding pollution are likely to be important when he is deciding how to evaluate the car and whether or not he should buy it. In another example, relevant profile attributes for a shampoo product will likely include the "animals" domain, because how a user feels about animal testing will play a part in how the user views the shampoo. Documents used to train this Machine Learning Model 180 can include a textual name or description of the Product 122 or Service 123, an image of the Product 122 or Service 123 which can be parsed using image recognition technology, and the like.

In some embodiments, there are multiple distinct Machine Learning Models 180 for various types of users. For example, there may be various Machine Learning Models 180 for users of various ages, languages, or demographics. Model Training Component 175 can create these various types of Machine Learning Models 180 by using the electronic documents associated with the different categories of users to generate the respective Machine Learning Model 180, and not including data from other categories.

In some embodiments, the Model Training Component 175 is used to generate the Machine Learning Models 180, and then is switched off. In such an embodiment, the models remain static. In some embodiments, however, the Model Training Component 175 may periodically be provided with additional training exemplars, in order to update the Machine Learning Models 180 to reflect changes in population or beliefs, or changes in the way information is shared. For example, in an embodiment, the performance of the one or more Machine Learning Models 180 is evaluated at set intervals, such as every day, week, month, and the like. If the performance falls below a desired level, the Machine Learning Models 180 can be retrained or refined. The performance of the Machine Learning Models 180 can be determined in a number of ways. For example, in an embodiment, the Machine Learning Models 180 are evaluated by calculating an area under a precision-recall (PR) curve or a receiver operating characteristic (ROC) curve.

Similarly, in some embodiments, the Machine Learning Models 180 are retrained periodically without regards to the performance of the models. Additionally, in some embodiments, new attributes or dimensions may be created as will be discussed in more detail below. In such an embodiment, the Model Training Component 175 will be used to process training documents for the new attribute, in order to update the Machine Learning Models 180.

In some embodiments, new attributes can be added to the list of attributes that make up the User Profiles 160, and old attributes may be removed. In one embodiment, an administrator or other person can manually add and remove attributes based on changing technologies, beliefs, concerns, and the like. For example, if intelligent alien life were discovered, an administrator may want to add a new attribute reflecting a user or provider's opinions and beliefs regarding the newly discovered alien life, because the new concern does not fit into one of the existing attribute categories. Similarly, if an existing category is no longer relevant, the administrator may remove it. In some embodiments, an unsupervised machine learning model can be used to detect emerging trends and dimensions. For example, the system could use clustering, anomaly detection, or other unsupervised machine learning methods to determine that a new attribute should be included, or that an existing attribute should be removed. In some embodiments, this unsupervised machine learning may be active for a period of time, and then deactivated at a later point once the system and models have matured. In other embodiments, however, the unsupervised machine learning may remain active.

In an embodiment, Pre-Processing Component 170 is used to pre-process input electronic documents that are provided to an unsupervised machine learning model, in much the same way as input is processed prior to being provided to Model Training Component 175. For example, such pre-processing can include associating weights with input documents, converting documents to feature vectors, removing stop words, punctuation, and other unnecessary elements, and the like. Similarly, in an embodiment, Pre-Processing Component 170 is used to pre-process input electronic documents that are to be processed using Machine Learning Model 180, in much the same way as input is processed prior to being provided to Model Training Component 175. For example, such pre-processing can include associating weights with input documents, converting documents to feature vectors, removing stop words, punctuation, and other unnecessary elements, and the like.

Evaluation Component 185 is generally used to aggregate the output of the Machine Learning Model 180 into User Profiles 160, as well as to compare and match the profiles. For example, a user's blog post may be processed using Machine Learning Model 180, which results in a plurality of attribute scores. These scores are incorporated into that particular user's User Profile 160 by Evaluation Component 185, in order to ensure that the User Profile 160 is up to date. In an embodiment, the User Profiles 160 are updated every time a new electronic document associated with the particular user or provider is provided as input. In other embodiments, the profiles are updated after a predefined period of time or upon some other triggering event. Additionally, while in some embodiments Evaluation Component 185 aggregates attribute values provided by Machine Learning Model 180, in other embodiments, Machine Learning Model 180 itself aggregates the scores from a corpus of documents, and creates or updates the User Profiles 160.

Evaluation Component 185 is also configured to compare User Profiles 160 in order to determine matching scores. For example, if a user has a particularly high attribute value in one dimension and another user has a particularly low score in that dimension, the Evaluation Component 185 may determine that the users have a low matching coefficient. In an embodiment, Evaluation Component 185 considers all of the attributes when generating matching scores for a given pair of User Profiles 160. Thus, even if two users have drastically different attribute values for one attribute, they may nevertheless have a fairly high matching score if they closely align on other attributes. In some embodiments, the user may specify a weight to assign each attribute by Evaluation Component 185. For example, a user may be significantly concerned with being environmentally friendly, but not particularly concerned about animal rights. In such an embodiment, the matching component may weigh the environmental attributes of the User Profiles 160 more heavily than the animal attribute.

Additionally, in some embodiments, Machine Learning Component 155 may itself determine weights for each attribute, based on a variety of factors. For example, if a large portion of a the electronic documents associated with a user are focused on only one attribute, Machine Learning Component 155 may determine that the particular attribute is very important to the user, and may give that attribute additional weight when generating matching scores. Accordingly, the weighting information may change over time as the input documents change to reflect the user's changing attitudes.

In an embodiment, matching scores are generated by comparing a first User Profile 160 to a second User Profile 160. That is, in an embodiment, a matching score is generated by selecting a first user (or the associated User Profile 160), and then selecting a second user (or User Profile 160) and comparing the second User Profile 160 to the first. In this way, as will be discussed in more detail below, the matching score generated by comparing a first User Profile 160 to a second User Profile 160 may differ from the matching score generated by comparing the second User Profile 160 to the first User Profile 160. This may be because of differences in settings or options between the two users, differences in how important each attribute is, and the like.

In some embodiments, Evaluation Component 185 may generate a numerical matching score, e.g., out of 100, which aggregates each of the dimensions in the User Profiles 160. In other embodiments, Evaluation Component 185 generates an N-dimensional vector matching score for N attributes, e.g., with a different score for each attribute. In other embodiments, however, Evaluation Component 185 is configured to generate a Boolean response: Match/No Match, for example based on one or more predefined thresholds. In an embodiment, this predefined threshold is set by the user. Thus, if two users, A and B, select differing thresholds, User B may be a "match" for User A, while User A is not a "match" for User B. For example, this can occur if the generated matching score is 0.75, User A has set his matching threshold to 0.6, and User B has set his matching threshold to 0.8. Thus, in an embodiment, when determining whether two User Profiles 160 match it is important to determine which User Profile 160 is the "first" one, to which the other User Profile 160 is being compared.

In some embodiments, whether users "match" may be determined through various machine learning algorithms. For example, a Machine Learning Model 180 may be trained to determine whether two User Profiles 160 match using sample User Profiles 160, along with an indication as to whether the users match. In an embodiment, the Machine Learning Model 180 can be refined based on user feedback. For example, if the Machine Learning Model 180 determines that two users "match," the user who requested the analysis may inform the system that they are not, in fact, a match. Machine Learning Model 180 may then be refined using this indication.

In some embodiments, Evaluation Component 185 is configured to generate matching scores based on all the differences between the User Profiles 160 for each attribute. In some embodiments, however, only certain differences may be material, e.g., where the difference between the users' attribute values exceeds a predefined threshold. For example, if a first User Profile 160 has a score of 0.3 for one attribute, and a second User Profile 160 has a score of 0.5 for that attribute, Evaluation Component 185 may determine that this difference is below the predefined threshold, and thus should not affect the matching score. As above, in an embodiment, this threshold is selected by each user. Thus, in an embodiment, the matching score itself may differ depending on the ordering of the users. For example, User A sets the threshold at 0.2, determining that she cares about even minor differences. User B may similarly decide that she does not care about minor differences, and set the threshold to 0.5. Thus, if User A and User B differ in any attribute by an amount between 0.2 and 0.5, e.g., by 0.35, the matching scores will differ depending on which user requested the matching score. That is, whether User B is compared to User A, or vice versa. In the example, if User A requests a matching score, User B is compared to User A using User A's lower threshold. Thus, the relatively small difference of 0.35 will reduce the matching score. Conversely, if User B requests a matching score such that User A is compared to User B, User B's relatively higher threshold will cause the difference of 0.35 to not be considered, which will result in a relatively higher matching score.

In another embodiment, the matching score between two users is not reduced if the second user has a higher or more extreme attribute value than the first user. That is, if the user requesting the matching score has a lower attribute value than the user she is being compared to. For example, if a first user has an "animal" score of 0.6, Evaluation Component 185 may determine that a second user with an "animal" score equal to or greater than 0.6 is a perfect (or near-perfect) match. Similarly, in an embodiment, if a first user has a "GMO" score of −0.4, Evaluation Component 185 may determine that anybody with a more extreme score (e.g., lower than −0.4) is even less supportive of GMO use, and therefore is still a match for the first user. In an embodiment, each user may determine whether or not this option is enabled. In some embodiments, the match score may be generated in such a way as to consider the magnitude of the differences in each dimension individually, in addition to or instead of aggregating the differences. Consider an example where a first User Profile 160 has scores of {0.4, 0.5, and 0.6} for the first three attributes, and a second User Profile 160 has scores of {0.3, 0.4, and 0.4}. There is an aggregate difference of 0.4 between the two profiles, but they are still fairly closely matched. If the second User Profile 160 was instead scored {−0.2, 0.5, and 0.6}, the aggregate difference is still just 0.5, but there is not as close a match, as evidenced by the large difference in the first attribute values. Thus, in an embodiment, Evaluation Component 185 may consider whether any particular attribute is very badly matched, in addition to or instead of considering the aggregate principle attribute values.

Figure 2:
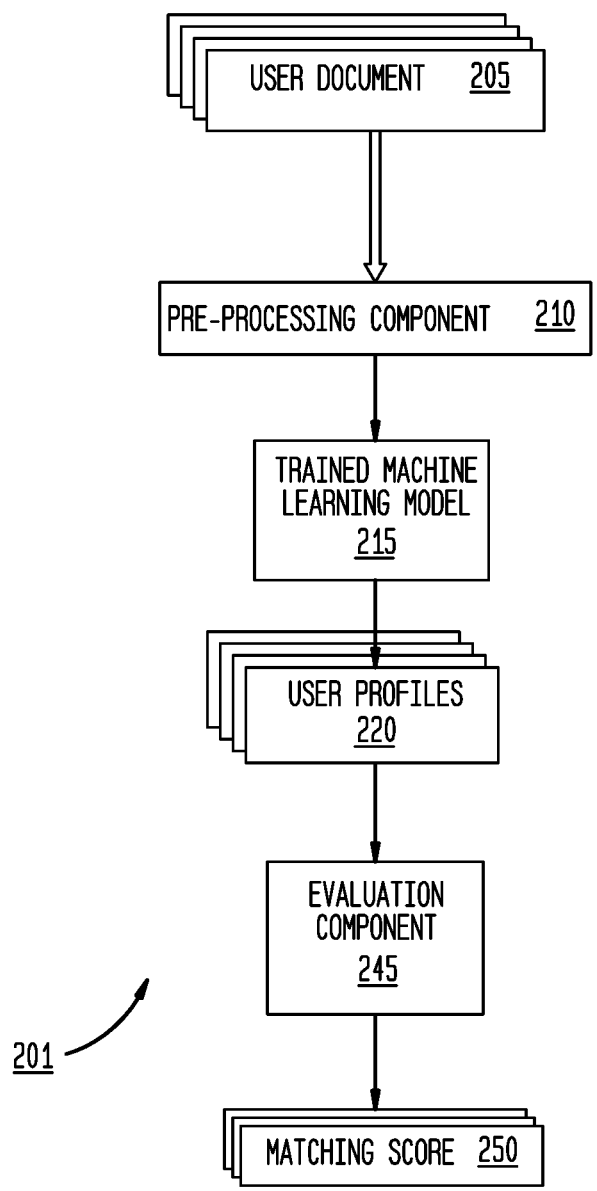
FIG. 2 illustrates an example of generating and comparing profiles using machine learning, according to one embodiment of the present disclosure.

Turning to FIG. 2, an example flow 201 for generating and comparing User Profiles 220 is illustrated. In the illustrated embodiment, User Documents 205 are first provided to a Pre-Processing Component 210. In the illustrated embodiment, User Documents 205 may be any electronic document that is associated with a user, as discussed above. As illustrated, the output of Pre-Processing Model 210 is provided to Trained Machine Learning Model 215, which processes the User Documents 205 to generate or update a User Profile 220 for each particular user. Once User Profiles 220 have been generated, they can be provided to Evaluation Component 245 to be compared and evaluated. Evaluation Component 245 generates a plurality of Matching Scores 250. For example, if one of the users associated with a User Profile 220 requests a comparison between a selection of other users and himself, Evaluation Component 245 generates Matching Scores 250, one for each other user in the selection.

The Matching Scores 250 can be used in a variety of ways to influence online interactions between the users and providers of goods and services. In some embodiments, the Matching Scores 250 are generated responsive to some action of a user. For example, a user may navigate a website containing reviews for any number of goods or services, which may trigger the generation of Matching Scores 250. For example, a user may initiate a search query at a retail website for a product the user wishes to purchase. In such an embodiment, a web application server could determine a list of products matching the search query, each of which may have any number of evaluations or reviews from other users associated with it. The Evaluation Component 185 may determine Matching Scores 250 by comparing each of the reviewer's User Profiles 220 against the current user's User Profile 220.

In an embodiment, the web application server then uses the Matching Scores 250 to sort the reviews, such that reviews from users that more closely match the user are nearer the top. In other embodiments, the reviews may be sorted such that reviewers who do not align with the current user are provided nearer the top. In some embodiments, Matching Scores 250 are not the only factor considered when searching the results. For example, other factors like how long the review is, how recent the review is, whether the reviewer is a confirmed purchaser, whether the review is a paid or sponsored review, and the like may also be considered when sorting the evaluations.

In some embodiments, one or more reviews may be filtered out of the list based on the associated Matching Score 250. For example, in an embodiment, reviewers who do not match the current user's profile may be filtered out so that the review and rating (e.g., a number of stars) of the product or service are not affected by them. As above, the determination as to whether a reviewer matches the user could be based on a predefined threshold. Similarly, as above, the matching score could consider all of the available attributes or a subset thereof. In this way, a user can ensure that the reviews they see were provided by other consumers who the user agrees with on a number of attributes in the User Profiles 220, which may indicate that they are likely to agree with those consumers as to the review as well. Similarly, the rating associated with the product, for example, a number of stars or a score out of ten, can be adjusted to only reflect the scores provided by reviewers who closely match the user's profile. In this way, users can make more informed decisions.

In a related embodiment, a current user may request that reviews from other users who match the current user's attribute values be filtered out, such that the provided reviews and ratings are only from reviewers that the user is likely to disagree with. This may be desirable for a variety of reasons. For example, if there are few or no reviews from individuals with profiles that match the current user, filtering out all non-matching reviews may not provide useful information. If only a few reviewers have similar profiles to the current user, the ratings and reviews may not be particularly accurate because of the small sample size. Providing only those reviewers who do not match with the user, however, may allow for better decision-making. For example, if a user sees that reviewers they disagree with tend to rate the product poorly, while the overall ratings are relatively higher, the user can determine that they are likely to rate the product higher than the average score indicates.

In an embodiment, reviewers are classified as "not matching" the current user when their Matching Score 250 is below a first threshold, while users are classified as "matching" when their Matching Score 250 is above a second threshold. In such an embodiment, there may be a number of reviewers who are not aligned closely enough with the user to be considered "matching," but similarly are not dissimilar enough to be considered "not matching." In such an embodiment, the current user may be able to see how highly individuals she disagrees with rate the product, without considering the reviews provided by individuals she is neither closely aligned with nor starkly differing from, which may inform her decision.

In the illustrated embodiment of FIG. 2, User Documents 205 may be used to update the User Profiles 220 as well as generate new profiles. In some embodiments, the User Profiles 220 are updated as soon as a new, previously unprocessed, electronic document becomes available. For example, as soon as a user posts a new status, his or her User Profile 220 may be updated to reflect any changes in their beliefs that may be evident. In another embodiment, the User Profiles 220 are not updated immediately upon the publishing of a new document, but rather at a later time. In one embodiment, the User Profiles 220 may be updated periodically, e.g., every hour, every day, every week, etc. Advantageously, this reduces the processing resources required by the system. Similarly, an update may be triggered manually by an administrator or a user.

In some embodiments, a user can provide private documents, such as texts, emails, diaries, and the like to the Trained Machine Learning Model 215 in order to see how their User Profile 220 changes. The use of these private documents may make the User Profile 220 more accurate, because the user is less likely to hide their opinions. In some embodiments, the system may permanently update the User Profile 220 in response to these documents, or may only consider documents that have been made publically available. Further, in some embodiments, the user can request that his or her User Profile 220 be permanently deleted, along with all associated User Documents 205.

Figure 3:
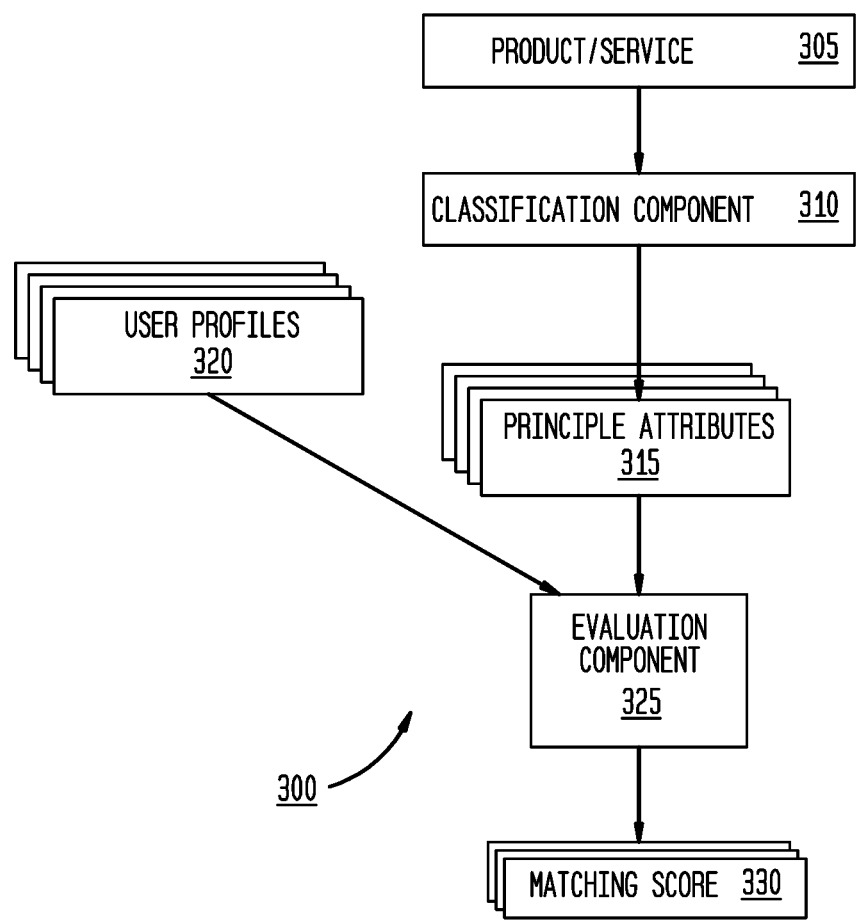
FIG. 3 illustrates an example of comparing profiles, according to one embodiment of the present disclosure.

In an embodiment, reviews and ratings may be sorted or filtered based on Matching Scores that are generated with respect to the particular product or service. FIG. 3 illustrates an example of comparing profiles, according to one embodiment of the present disclosure. As illustrated, a particular Product or Service 305 may be provided to a Classification Component 310. In an embodiment, Classification Component 310 is a sub-component of the Machine Learning Component 155. For example, Classification Component 310 may comprise a Machine Learning Model 180, as discussed above. In the illustrated embodiment, Classification Component determines or generates one or more Principal Attributes 315 from the received Product or Service 305. To do so, Classification Component 310 may consider a description of the Product/Service 305, the title or name of the Product/Service 305, the provider of the Product/Service 305, and the like. Similarly, in some embodiments, Classification Component 310 is configured to process one or more images of the Product/Service 305 in order to determine what it is.

For example, if a user is shopping for lawn mowers, Classification Component 310 may receive a provided description, the name or title of the product, pictures of the product, and the like. In the example, Classification Component 310 may be a machine learning model that processes the description of the product to determine what it is and what attributes are relevant. In an embodiment, a Principal Attribute 315 is relevant to a good or service because the good or service involves the attribute in some way, or because a user or consumer would likely consider that attribute when deciding whether to purchase the product or service. In the example of a lawn mower, Classification Component 310 may determine that an "environment" attribute is relevant, because a consumer might want to consider how much pollution the lawn mower would produce, or how fuel efficient it is. As another example, if the provided Product/Service 305 is an electrical device, Classification Component 310 may determine that a "people" Principal Attribute 315 is relevant, because the consumer may want to consider whether the workers who produced the device are treated well.

In the illustrated embodiment of FIG. 3, Evaluation Component 325 receives the determined relevant Principal Attributes 315, as well as a number of User Profiles 320. For example, each User Profile 320 may correspond to a reviewer who has provided an evaluation of the Product/Service 305. Further, User Profiles 320 includes the User Profile 320 of the requesting user. As illustrated, Evaluation Component 325 generates a Matching Score 330 for each User Profile 320, taking into account the determined relevant Principal Attributes 315. In an embodiment, Evaluation Component 325 may consider only those Principal Attributes 315 that were determined to be relevant. In another embodiment, Evaluation Component weights the relevant Principal Attributes 315 more heavily, but still considers all of the attributes available in the User Profiles 320.

In some embodiments, the Matching Scores may be provided to the user, enabling the user to make more informed decisions. In such an embodiment, for example, the user may be able to see how closely each reviewer matches with themselves, and thus determine how much trust they should place in the review. Similarly, the user may determine that even the most closely matched reviewer is still not very closely aligned with themselves, and therefore should not be trusted excessively. In an embodiment, the matching score may be provided as a number. In another embodiment where the matching score is an N-dimensional vector, the matching scores may be visualized using a radar chart, or other methods.

In other embodiments, however, the Matching Scores are not provided to the user. In some embodiments, the reviews are simply sorted or filtered with no indication of how closely aligned each reviewer is, other than perhaps the order that they are presented in. In other embodiments, the user may be provided with a more overt indication of the Matching Scores (e.g., how closely his principles align with each reviewer), without giving the actual value. For example, the reviews may be sorted into categories ranging from "very closely aligned" to "not at all aligned," and may be colored or highlighted differently. In this embodiment, the user can make informed decisions about each review, but is not distracted or confused by the actual Matching Scores. For example, two reviewers with high Matching Scores may be sorted into the category of "very closely aligned," but not sorted within that category, so that the user may peruse the closely-aligned reviewers without being influenced by minimal differences in Matching Scores 330 that are not likely to carry much significance.

In some embodiments, matching coefficients may be generated in contexts other than reviews on products and services. For example, in one embodiment, similar methods can be applied to sort or filter comments on an article or video so that a user can be presented with input from commenters that either align with their principals or are not aligned with them. Similarly, the context of the article or video itself may be considered to determine which Principal Attribute(s) 315 are relevant. In related embodiments, the techniques described herein may be used to filter or sort any sort of data provided by users.

In an embodiment, matching scores are generated and reviews are filtered or sorted for a particular selected product or service. In a related embodiment, reviews or ratings are filtered or sorted for a variety of products or services at once, before a user has selected any particular one. For example, a user may initiate a search for a product or service, and receive a list of results. These results may be sorted or filtered in any number of ways, including based on an average rating or number of stars for each. In such an embodiment, the user may wish to sort or filter the results based not only on the overall rating, but also based on the updated rating when the User Profiles 320 of the reviewers are taken into account. For example, each product or service may be provided, along with the associated reviews, to the system for processing. The resulting updated ratings for each product or service can then be used to filter or sort the list, which provides the user with more customized results before even selecting a particular product or service for additional consideration.

Figure 4:
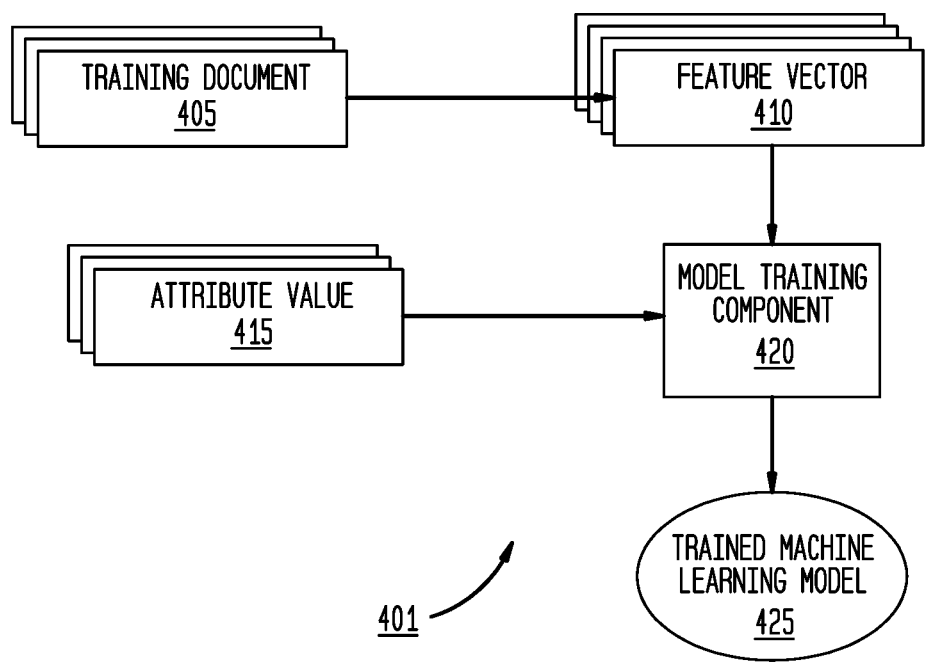
FIG. 4 illustrates a method for creating and maintaining a supervised machine learning model for generating profiles, according to one embodiment of the present disclosure.

FIG. 4 illustrates a method 401 for generating and updating a supervised machine learning model. As used herein, "trained machine learning" is used interchangeably with "supervised machine learning," and generally refers to machine learning that utilizes exemplars and pre-defined attribute scores to train the model. As illustrated, a corpus of Training Documents 405 are converted into Feature Vectors 410. These Feature Vectors 410 are provided to a Model Training Component 420, along with a set of associated Attribute Values 415. That is, each Training Document 405 is associated with one or more Attribute Values 415 for the principle attributes used by the system, wherein each of the one or more Attributes Values 415 represents a measure of an ethical attribute indicated by the corresponding Training Document 405. For example, a blog post about attending an animal rights protest could indicate a positive score for an "animal" attribute, but could get a neutral score for other attributes such as a politics attribute. The Model Training Component 420 uses supervised machine learning techniques to generate and update a Trained Machine Learning Model 425, which can then be used to process new electronic documents. Such techniques may include classification and regression techniques, among others. In this way, an updated model can be maintained that can be used to generate user and provider profiles.

Figure 5:
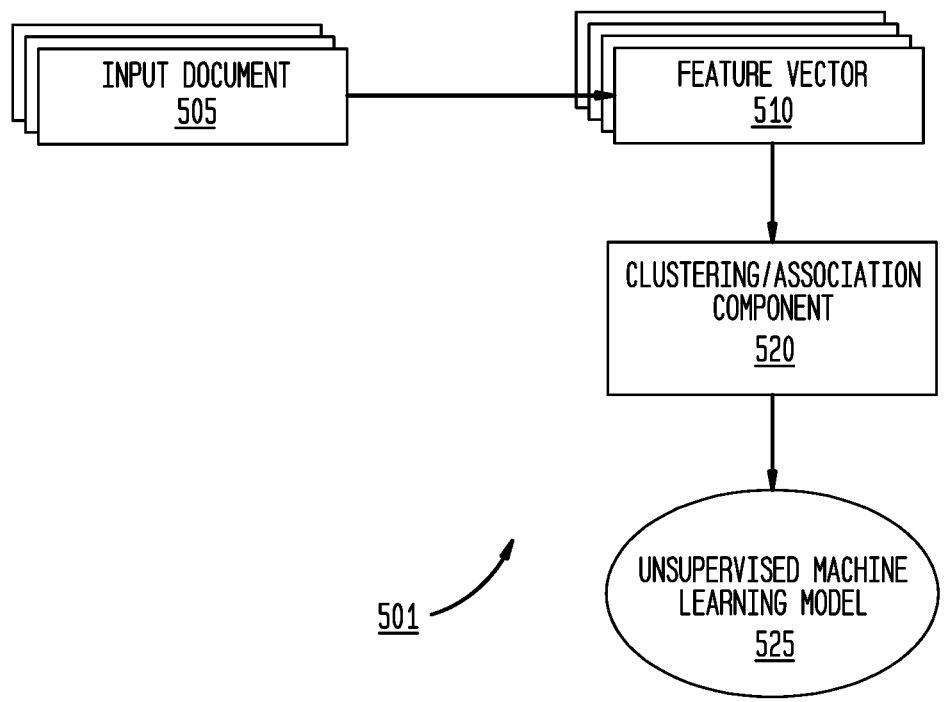
FIG. 5 illustrates a method for creating and maintaining an unsupervised machine learning model for identifying emerging trends, according to one embodiment of the present disclosure.

FIG. 5 illustrates a method 501 for unsupervised machine learning to identify emerging trends or attributes that should be added or removed from the profiles. The techniques may include clustering, association, and other unsupervised machine learning techniques. As illustrated, a plurality of Input Documents 505 are first used to generate Feature Vectors 510, and are provided to Clustering/Association Component 520, which generates an Unsupervised Machine Learning Model 525. This Unsupervised Machine Learning Model 525 can be continuously updated to help detect emerging trends and scandals, for example, through clustering, word maps, and the like. This data can then be used to add or remove attributes from the user profiles.

FIGS. 6A through 6E illustrate filtered reviews, according to one embodiment of the present disclosure. As illustrated in FIG. 6A, a selected product or service has a rating 600A of 4 out of 5 stars, based on 5,737 reviews. As illustrated, this rating 600A represents the overall evaluation of the product or service, e.g., with the filter set to "All Reviewers" and without considering the individual ethics of each reviewer. As illustrated in FIG. 6B, the current user has changed the filter to display only reviews from "Reviewers with matching principal attributes." In the illustrated embodiment, the rating 600B has been updated to reflect only the ratings from matching reviewers, and is now 3.5 out of 5 stars, based on 1,351 reviews. That is, as illustrated, of the 5,737 total reviews, 1,351 of them were provided by reviewers who are considered "matching" with the current user. Similarly, as evidenced by the lower rating, it is evident that reviewers who closely align with the current user tend to rate the particular product or service worse than the average reviewer does. This allows the user to more accurately determine how much he or she will like the product or service.

As illustrated in FIG. 6C, the user has adjusted the filter to provide "Reviewers with differing principal attributes." As illustrated, based on this filter, the rating 600C has been updated to 4. 5 out of 5 stars, based on the 4,386 reviewers who differ from the user. This indicates that the user disagrees with tend to rate the product more highly than the average consumer. Of course, as discussed above, the thresholds for "matching" and "not matching" may be different, such that there are fewer than 4,386 reviewers included in this filtration setting. As illustrated in FIG. 6D, the filter setting has been changed to "Reviewers with matching relevant principal attributes." As discussed above, the relevant attributes may be ethics domains that are related to the product or service. As illustrated, the rating 600D has been updated and is now only 3 out of 5 stars, based on 1,872 reviews. Thus, in the illustrated embodiment, there are more reviewers who align with the user when considering the relevant attributes, as opposed to reviewers who align with the user when considering all attributes. Furthermore, the lower score of 3 stars when considering relevant attributes, as opposed to 3.5 stars when considering all attributes, indicates that the user is even more likely to rate the product or service relatively lower than the average user, because people who have similar relevant attributes rate the product relatively lower. For example, this may be because users with similar "environment" scores do not like how fuel-inefficient the product is, or because users with similar "animal" scores do not like that the product was tested on animals.

FIG. 6E illustrates an embodiment where the user has filtered the reviews and ratings to "Reviewers with differing relevant attributes." As illustrated, the updater rating 600E is now 5 out of 5 stars, based on 3,865 reviews. This indicates that reviewers who are not aligned with the relevant attributes of the user tend to rate the product very highly. This can inform the user that she may not like the product, because people who she tends to disagree with like the product very much.

Figure 7:
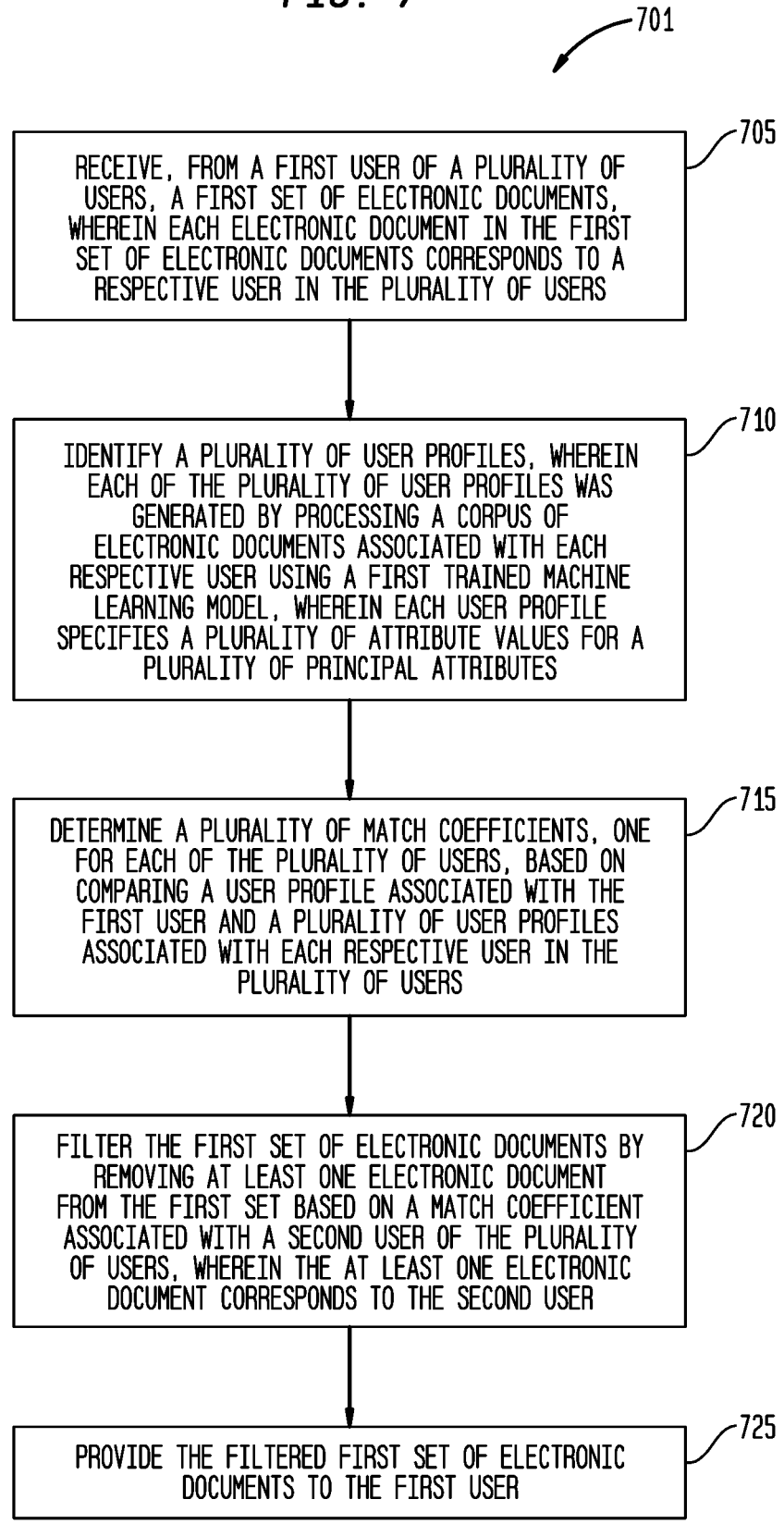
FIG. 7 illustrates a method for filtering content, and generating and comparing profiles using machine learning, according to one embodiment of the present disclosure.

FIG. 7 is a method 701 for generating user profiles and influencing online interactions based on those profiles. The method begins at block 705, where Matching Server 140 receives, from a first user of a plurality of users, a first set of electronic documents, wherein each electronic document in the first set of electronic documents corresponds to a respective user in the plurality of users. At block 720, Matching Server 140 identifies a plurality of user profiles, wherein each of the plurality of user profiles was generated by processing a corpus of electronic documents associated with each respective user using a first trained machine learning model, wherein each user profile specifies a plurality of attribute values for a plurality of principle attributes. Matching Server 140 further determines a plurality of match coefficients, one for each of the plurality of users, based on comparing a user profile associated with the first user and a plurality of user profiles associated with each respective user in the plurality of users, at block 715. At block 720, Matching Server 140 filters the first set of electronic documents by removing at least one electronic document from the first set based on a match coefficient associated with a second user of the plurality of users, wherein the at least one electronic document corresponds to the second user. Finally, at block 725, Matching Server 140 provides the filtered first set of electronic documents to the first user.

Figure 8:
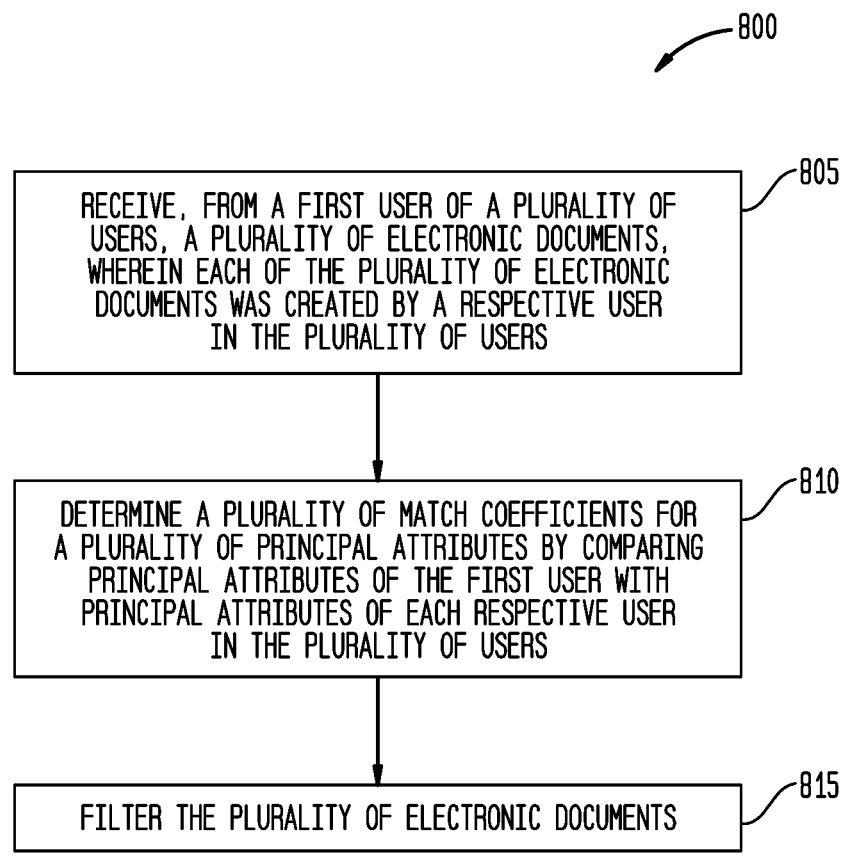
FIG. 8 illustrates a method for filtering content according to one embodiment of the present disclosure

FIG. 8 illustrates a method 801 for influencing online interactions based on comparing attributes. At block 805, Matching Server 140 receives, from a first user of a plurality of users, a plurality of electronic documents, wherein each of the plurality of electronic documents was created by a respective user in the plurality of users. At block 810, Matching Server determines a plurality of match coefficients for a plurality of principal attributes by comparing principal attributes of the first user with principal attributes of each respective user in the plurality of users. Finally, at block 815, Matching Server 140 filters the plurality of electronic documents based at least in part on the determined match coefficients.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a machine learning or comparison component) or related data available in the cloud. For example, the machine learning system could execute on a computing system in the cloud and generate, store, and compare profiles at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system, comprising:
a processor; and
a computer memory storing a program, which, when executed on the processor, performs an operation comprising:
receiving a first set of electronic documents, wherein each electronic document in the first set of electronic documents corresponds to a respective user in a plurality of users;
generating a first user profile comprising a plurality of principal attributes for a first user using a trained machine learning model, comprising:
generating a feature vector for an electronic document authored by the first user;
generating a numerical score for a first attribute of the plurality of principal attributes by processing the feature vector using the trained machine learning model, wherein the trained machine learning model was trained based on a plurality of documents, each respective document associated with a corresponding label indicating a respective score of the respective document with respect to the first attribute; and
updating the first user profile based on the generated numerical score;
identifying a new attribute using one or more unsupervised machine learning models, wherein the new attribute is not included in the plurality of principal attributes;
adding the new attribute to the plurality of principal attributes in the first user profile;
updating the first user profile to include a numerical score for the new attribute;
identifying a plurality of user profiles, wherein each of the plurality of user profiles was generated by processing a corpus of electronic documents associated with each respective user using the trained machine learning model, wherein each user profile specifies a plurality of attribute values for the plurality of principal attributes;
determining a plurality of match coefficients, one for each of the plurality of users, based on comparing the first user profile associated with the first user and the plurality of user profiles associated with each respective user in the plurality of users, wherein the plurality of match coefficients comprise numerical values indicating how closely matched the first user is with each respective user;
filtering the first set of electronic documents by removing at least one electronic document from the first set based on a match coefficient associated with a second user of the plurality of users, wherein the at least one electronic document corresponds to the second user; and
providing the filtered first set of electronic documents to the first user.

2. The system of claim 1, wherein the at least one electronic document is removed from the first set of electronic documents based on determining that the match coefficient associated with the second user does not exceed a predefined threshold.

3. The system of claim 1, wherein the at least one electronic document is removed from the first set of electronic documents based on determining that the match coefficient associated with the second user exceeds a predefined threshold.

4. The system of claim 1, wherein each electronic document in the first set of electronic documents comprises a rating of a product or service.

5. The system of claim 4, wherein determining the plurality of match coefficients comprises:
identifying one or more of the plurality of principal attributes that are relevant to the product or service; and
comparing only the one or more identified principal attributes.

6. The system of claim 4, the operation further comprising:
calculating an updated rating for the product or service based on the filtered first set of electronic documents.

7. The system of claim 1, the operation further comprising:
providing at least an indication of the plurality of match coefficients to the first user.

8. The system of claim 1, the operation further comprising:
sorting the filtered first set of electronic documents.

9. A method, performed by one or more processors, comprising:
receiving a plurality of electronic documents, wherein each of the plurality of electronic documents was created by a respective user in a plurality of users;
generating a first user profile comprising a plurality of principal attributes for a first user using a trained machine learning model, comprising:
generating a feature vector for an electronic document authored by the first user;
generating a numerical score for a first attribute of the plurality of principal attributes by processing the feature vector using the trained machine learning model, wherein the trained machine learning model was trained based on a plurality of documents, each respective document associated with a corresponding label indicating a respective score of the respective document with respect to the first attribute; and
updating the first user profile based on the generated numerical score;
identifying a new attribute using one or more unsupervised machine learning models, wherein the new attribute is not included in the plurality of principal attributes;
adding the new attribute to the plurality of principal attributes in the first user profile;
updating the first user profile to include a numerical score for the new attribute;
determining a plurality of match coefficients for the plurality of principal attributes, one for each of the plurality of users, by comparing the first user profile with a respective user profile of each respective user in the plurality of users, wherein the plurality of match coefficients comprise numerical values indicating how closely matched the first user is with each respective user; and
filtering the plurality of electronic documents based at least in part on the determined match coefficients.

10. The method of claim 9, wherein the plurality of principal attributes for each user are generated by processing a corpus of electronic documents associated with each respective user using a first trained machine learning model.

11. The method of claim 9, wherein each of the plurality of electronic documents are associated with a first concept, and wherein determining the plurality of match coefficients comprises:

identifying one or more of the plurality of principal attributes that are relevant to the first concept; and comparing only the one or more identified principal attributes.

12. The method of claim 9, wherein each of the plurality of electronic documents comprises a rating of a product or service, the method further comprising:

calculating an updated rating for the product or service based on the filtered plurality of electronic documents.

13. A computer-readable storage medium having computer-readable program code embodied therewith, the computer-readable program code executable by one or more computer processors to perform an operation comprising:

receiving a first set of electronic documents, wherein each electronic document in the first set of electronic documents corresponds to a respective user in a plurality of users;

generating a first user profile comprising a plurality of principal attributes for a first user using a trained machine learning model, comprising:

generating a feature vector for an electronic document authored by the first user;

generating a numerical score for a first attribute of the plurality of principal attributes by processing the feature vector using the trained machine learning model, wherein the trained machine learning model was trained based on a plurality of documents, each respective document associated with a corresponding label indicating a respective score of the respective document with respect to the first attribute; and updating the first user profile based on the generated numerical score;

identifying a new attribute using one or more unsupervised machine learning models, wherein the new attribute is not included in the plurality of principal attributes;

adding the new attribute to the plurality of principal attributes in the first user profile;

updating the first user profile to include a numerical score for the new attribute;

identifying a plurality of user profiles, wherein each of the plurality of user profiles was generated by processing a corpus of electronic documents associated with each respective user using the trained machine learning model, wherein each user profile specifies a plurality of attribute values for the plurality of principal attributes;

determining a plurality of match coefficients, one for each of the plurality of users, based on comparing the first user profile associated with the first user and the plurality of user profiles associated with each respective user in the plurality of users, wherein the plurality of match coefficients comprise numerical values indicating how closely matched the first user is with each respective user;

filtering the first set of electronic documents by removing at least one electronic document from the first set based on a match coefficient associated with a second user of the plurality of users, wherein the at least one electronic document corresponds to the second user; and providing the filtered first set of electronic documents to the first user.

14. The computer-readable storage medium of claim 13, wherein the at least one electronic document is removed from the first set of electronic documents based on determining that the match coefficient associated with the second user does not exceed a predefined threshold.

15. The computer-readable storage medium of claim 13, wherein the at least one electronic document is removed from the first set of electronic documents based on determining that the match coefficient associated with the second user exceeds a predefined threshold.

16. The computer-readable storage medium of claim 13, wherein each electronic document in the first set of electronic documents comprises a rating of a product or service.

17. The computer-readable storage medium of claim 16, wherein determining the plurality of match coefficients comprises:

identifying one or more of the plurality of principal attributes that are relevant to the product or service; and comparing only the one or more identified principal attributes.

18. The computer-readable storage medium of claim 16, the operation further comprising:

calculating an updated rating for the product or service based on the filtered first set of electronic documents.

19. The computer-readable storage medium of claim 13, the operation further comprising:

providing at least an indication of the plurality of match coefficients to the first user.

20. The computer-readable storage medium of claim 13, the operation further comprising:

sorting the filtered first set of electronic documents.

* * * * *